July 3, 1951        H. H. CLARK        2,559,400

SPRING TESTING MACHINE

Filed Jan. 8, 1945        2 Sheets—Sheet 1

INVENTOR.
HOWARD HOY CLARK
BY McDonald and Teagno
ATTORNEYS

July 3, 1951 H. H. CLARK 2,559,400
SPRING TESTING MACHINE
Filed Jan. 8, 1945 2 Sheets-Sheet 2
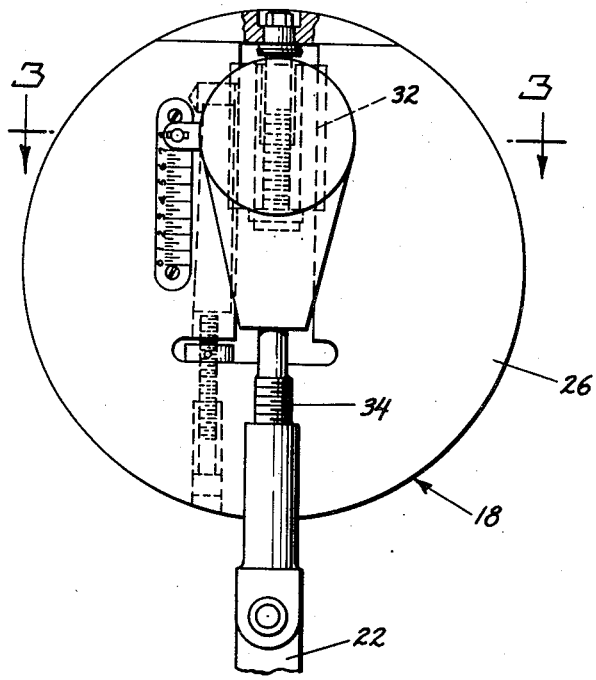
Fig. 2.
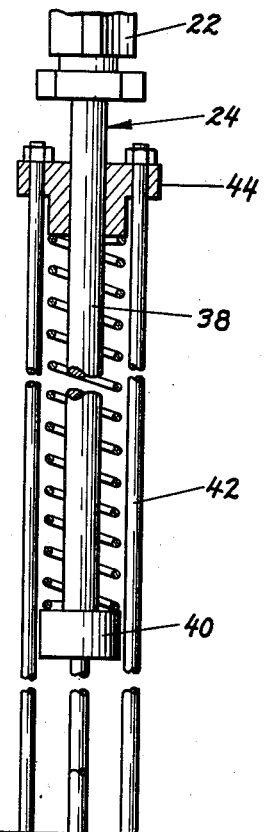
Fig. 4.
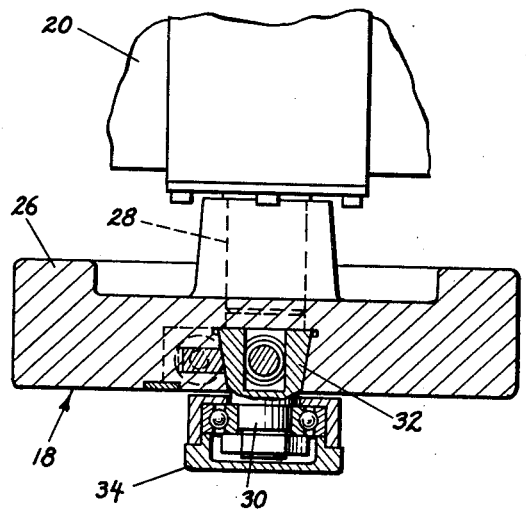
Fig. 3.
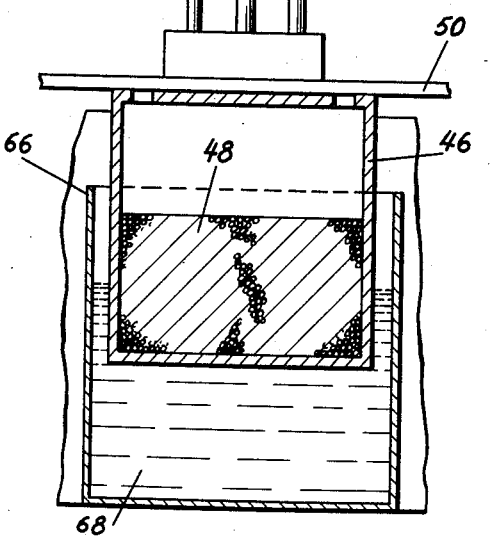
INVENTOR.
HOWARD HOY CLARK
BY
McDonald and Tiagno
ATTORNEYS Patented July 3, 1951

2,559,400

UNITED STATES PATENT OFFICE 2,559,400

SPRING TESTING MACHINE

Howard Hoy Clark, Detroit, Mich., assignor to Eaton Manufacturing Company, Cleveland, Ohio, a corporation of Ohio Application January 8, 1945, Serial No. 571,736

1 Claim. (Cl. 73—161)

This invention relates to coil springs and more particularly to a testing machine therefor.

Broadly the invention comprehends a machine for testing the fatigue of high stressed coil springs.

Heretofore no machine has been devised for vibrating coiled helical springs at their resonant frequency such that the fatigue thereof could be obtained. The instant invention provides just such a machine.

An object of the invention is to provide a machine for deflecting coil springs at a relatively high speed.

Another object of the invention is to provide a machine for quickly and effectively testing the fatigue of a coil spring.

A further object of the invention is the provision of a machine for testing the fatigue of coil springs to be used in service under highly vibratory conditions.

A yet further object of the invention is to provide a fatigue testing machine for assimilating operating conditions of high stressed coil springs.

And yet a still further object of the invention is to provide a machine for vibrating a spring such that the velocity of propagation of the spring is approximately equal to the velocity of displacement thereof.

Other objects and advantages of the invention will appear from the following description taken in connection with the drawings forming a part of the specification, and in which:

Figure 2 is a plan view of the adjustable crank incorporated in the testing machine;

Figure 3 is a view on line 3—3 of Figure 2; and

Figure 4 is an enlarged fragmentary view of the spring mounting means and vibration damper therefor.

Figure 1:
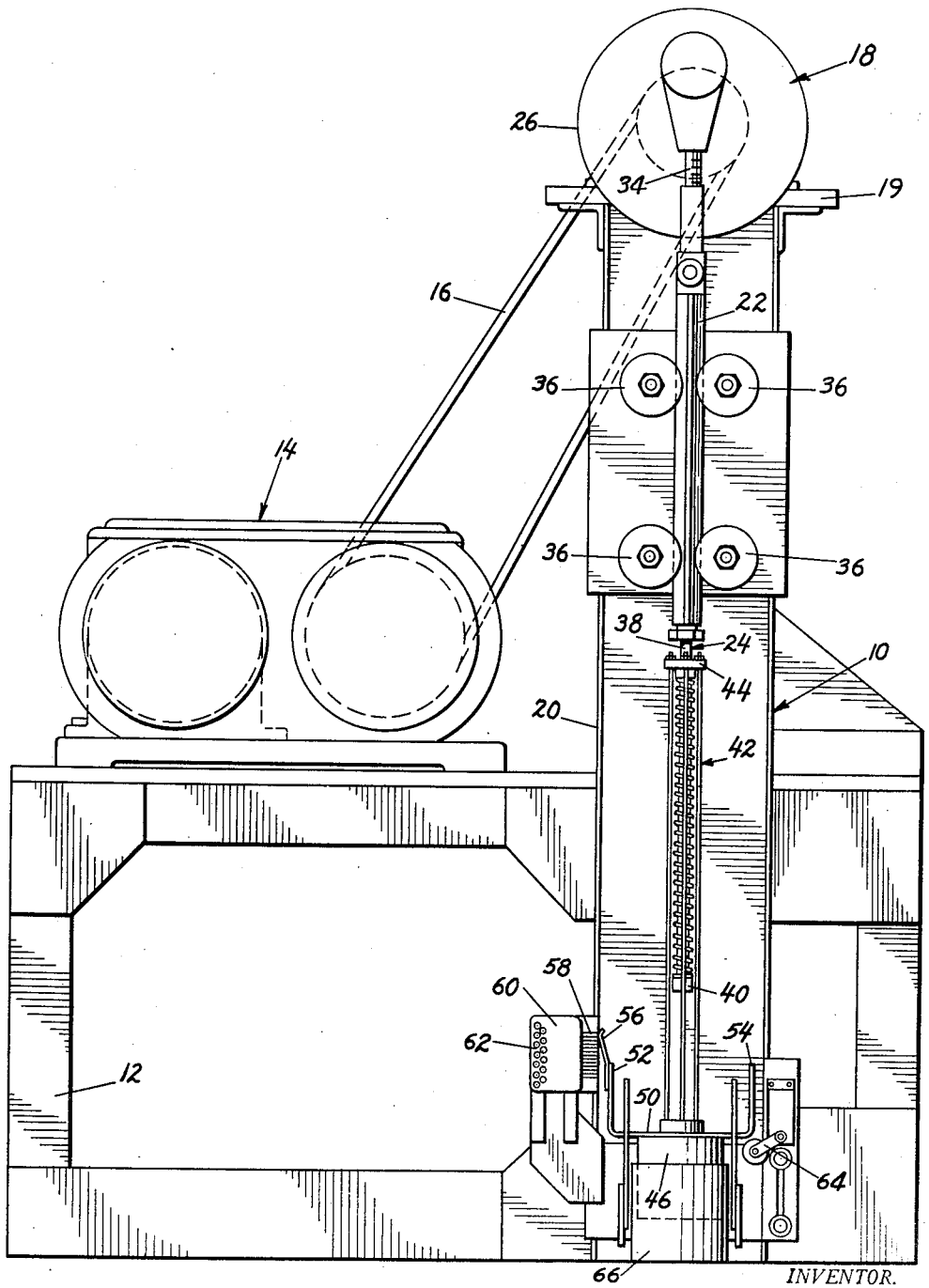
Figure 1 is a side plan view of the testing machine mounting a spring for test.

It is generally assumed in coil spring design that displacement takes place simultaneously in all coils, that stresses in all points in the wire of the spring are equal at any instant, and that the spring comes to rest immediately and entirely when displacement ceases. These assumptions require that the motion imparted to one end of the spring be propagated along the axis of the spring with infinite velocity; whereas, actually the velocity of propagation has a finite value; but so long as the velocity of propagation is high in comparison with the velocity of displacement, no great errors will result from design assumptions based on the concept of infinite propagation velocity.

In cases where the finite order of the velocity of propagation is recognized and conceded, it is obvious that a disturbance originated at one end of the spring requires a certain lapse of time before it reaches the other end of the spring. The disturbance is then reflected to the moving end of the spring where it is again set in motion. The nature of the wave motion thus induced in the intermediate coils of the spring is influenced by the relationship existing between the velocity of propagation and the velocity of displacement. If the velocity of displacement exceeds the velocity of propagation, the condition inherent in gun recoil springs and other springs subject to similar duty, the resulting motion produces higher stress in the end coils than in the more centrally located intermediate coils. In consequence, the maximum stress to which the end coils are subjected is much greater than the so-called "static" value, and the minimum stress is much less than the static value. It is to be appreciated that the severity of the condition is further increased because the rate of oscillation in the stress cycle is at the natural frequency of the spring itself and not at the cyclic rate of springs undergoing stress similar to gun recoil springs, nor at the cyclic rate of displacement of springs undergoing conditions different from said high stressed springs.

The present invention is directed at vibrating springs at their resonant frequency to obtain fatigue testing thereof inasmuch as it is realized that springs designed according to conventional static concepts of what takes place when a spring is deflected behave entirely different if the springs are deflected at high speeds.

The instant invention evolves about a machine constructed to life test springs at their resonant frequency. The machine is provided with a motor operated crank having a small throw and adapted to rotate at high speeds. The crank has mounted thereon a connecting rod, the vertical cross head of which has pivotally secured thereto a piston rod, said piston rod in turn having a piston affixed thereto. A spring mounting comprising a cage for confining the spring is movably mounted on the piston rod such that the spring to undergo tests has its moving end in engagement with the piston, and its fixed end supporting the cage. A cylindrical bucket having an appreciable amount of weight therein is adapted to be received by a cylinder filled with a suitable liquid for dampening the motion of the cage and piston during the operational movement thereof. The mass bucket and cage additionally provide a constant mean load and stress to the spring undergoing test so as to provide automatic compensation for the effects of set such that the springs are tested under a constant stress cycle. Means are associated with the mass bucket providing for indicating the amount of set obtained during each test, and other means are secured to the bucket for breaking the power circuit when the spring fails so as to automatically stop the motive power.

In the construction of the machine covering this invention, the rotational speed of the crank is made relatively high and is adjustable for each test so that the spring is substantially in resonance; in which case the velocity of propagation is approximately equal to the velocity of displacement. As a result of this condition the motion imparted to the coils is a wave motion of extreme amplitude substantially like the wave motion imparted to the coils of springs under actual operating conditions. Because of the relatively high amplitude of motion of the coils of the spring together with the high velocity thereof produced by the crank motion, the failure of the springs tested occurs much more readily than those tested by conventional testing machines; this failure occurring in conformity to the life of springs in service under highly vibratory conditions. Furthermore this testing machine provides for failure of the springs invariably in the region of the end coils, a situation typical of actual failures in service under like conditions; whereas, in the conventional type of testing machine failure occurs in any coil.

Referring to the drawings for more particular details of the invention, 10 represents generally a spring testing machine comprising a stand 12, a variable speed motor 14 fixedly mounted on the stand, a belt drive 16 coupling the motor to a crank rig 18 journaled on a plate 19 affixed to a suitable frame 20, and a vertical crosshead 22 connecting the crank rig to a spring mounting assembly 24.

The crank rig 18 comprises a flywheel 26 splined to a shaft 28 driven by the motor 14 through belt 16, an adjustable crank pin 30 journaled in a slidable member 32 mounted in the flywheel, and a connecting rod 34 having one end rotatably mounted on crank pin 30, and the other end pivotally secured to one end of crosshead 22. The crosshead 22 is reciprocably movably mounted on rollers 36 affixed to the frame 20.

The spring mounting assembly comprises a piston rod 38 secured to the crosshead 22 and a piston 40 affixed to the piston rod, said piston adapted to support the spring to be tested, the other end of the spring to be tested in turn supporting a cage 42 having a collar 44 received by a slidable member upon piston rod 38. The cage 42 mounted on the spring confines the spring and has secured upon one extremity thereof a cylindrical bucket 46 carrying a mass 48 of steel shot or other suitable material for adding weight to the spring cage system. The bucket 46 is provided with a member 50 having arms 52 and 54, arm 52 having a contactor 56 adapted to engage electrical contactors 58 of an electrical switch box 60 mounted on frame 20 for the purpose of lighting equidistantly spaced lights 62 and thus have indication of set taking place in the spring during the testing thereof. Arm 54 is adapted to engage a trip switch 64 for automatically breaking the motor electric circuit and thus stop the motive power for the crank.

A cylinder 66 containing a suitable liquid 68 receives the bucket 46 and provides for dampening the flutter action of the bucket and cage during motion thereof.

In a normal operation upon actuation of the crank rig 18 and transmittal of motion therefrom through crosshead 22 to the piston rod 38 so as to provide for motion of the spring to be tested, at very low speeds of reciprocation of the spring, the cage and bucket move up and down at virtually full crank amplitude with result that there is no appreciable amplitude in the spring as it moves substantially as a rigid body. As the speed of the crank is increased, the amplitude of motion of the cage and bucket is increased until this amplitude reaches a maximum critical value whereupon with further increase in speed of vibration imparted to the spring the amplitude of the cage and bucket is decreased. This decrease in amplitude of motion in the cage and bucket continues with increase of speed in the crank until at the speed used for life testing the spring, the cage, and bucket have practically no amplitude of motion. With the crank rotating at resonant frequency of the spring, the life test of the spring is begun, observance of the light that is lit corresponding to the contactor 56 and the spring vibrated until failure occurs. As set takes place in the spring during the testing thereof, it is indicated by the relative movement of contactor 56 and the illumination of the light corresponding to such point of contact. By observing the set the spring takes, it can readily be determined whether failure occurred from breakage or permanent set. Upon failure of the spring, the cage and bucket descend immediately, arm 54 engaging trip switch 64 and thus provide for immediate stopping of the motive power for actuating the crank. This completes a cycle of operation.

While this invention has been described in connection with certain specific embodiments, the principle involved is susceptible of numerous other applications that will readily occur to persons skilled in the art. The invention is, therefore, limited only as indicated by the scope of the appended claim.

What I claim is:

In a coil spring fatigue testing machine, actuating means including a rod supporting one end of a spring to be tested in a vertical telescoping relation thereto, said actuating means being adjustable to the speed and amplitude necessary to vibrate the spring at its maximum critical value, means having a part telescoped by the rod and spring directly freely supported on the other end of the spring applying a constant mean load upon the spring along its axis of vibration, and means for dampening the motion of the constant mean load means.

HOWARD HOY CLARK.

REFERENCES CITED

The following references are of record in the file of this patent:

UNITED STATES PATENTS

| Number | Name | Date |
|---|---|---|
| 1,499,546 | Oxley | July 1, 1924 |
| 1,743,619 | Pfeiffer | Jan. 14, 1930 |
| 1,898,529 | Farmer | Feb. 21, 1933 |
| 2,049,644 | Essen | Aug. 4, 1936 |
| 2,167,872 | Bristol | Aug. 1, 1939 |
| 2,283,743 | Lessig | May 19, 1942 |
| 2,285,090 | Hiley | June 2, 1942 |
| 2,350,722 | Buckingham | June 6, 1944 |